Figure 1:
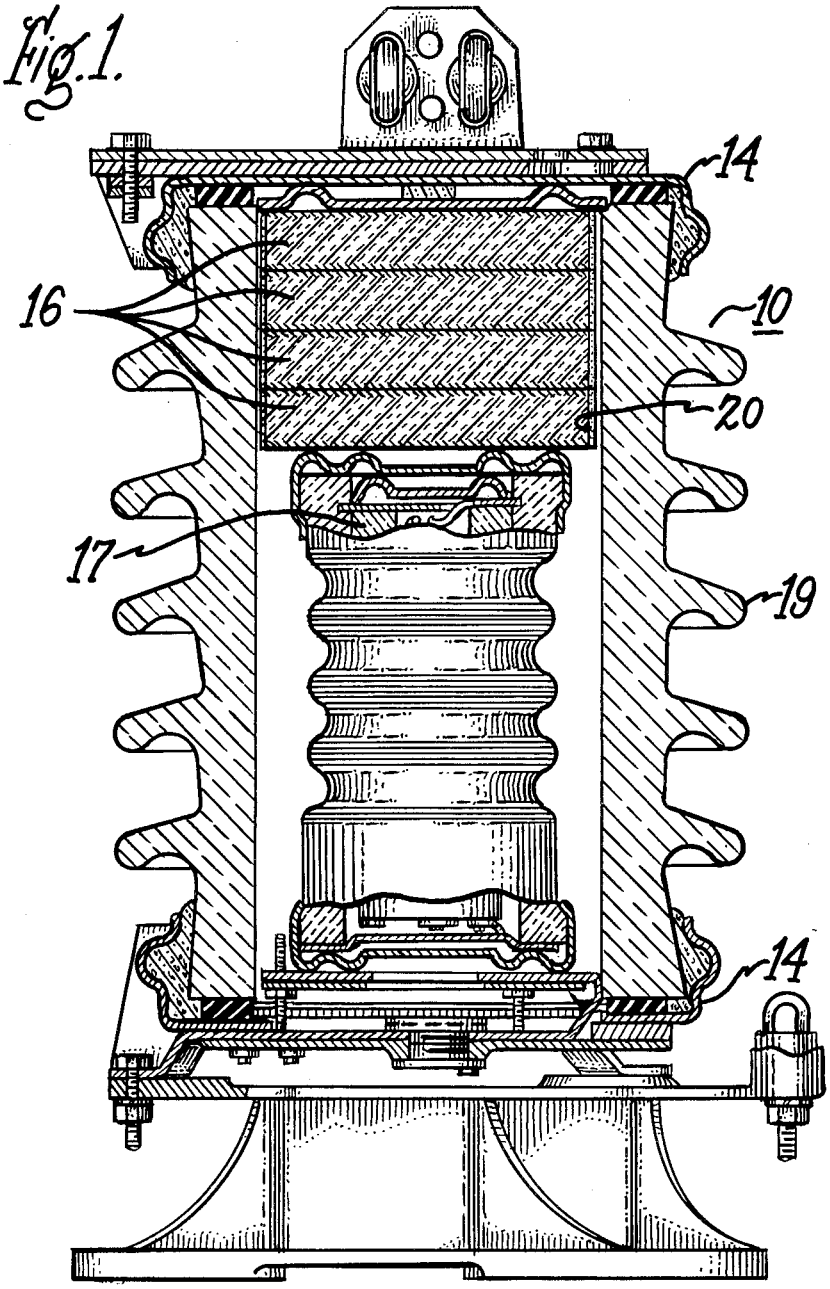
Figure 2:
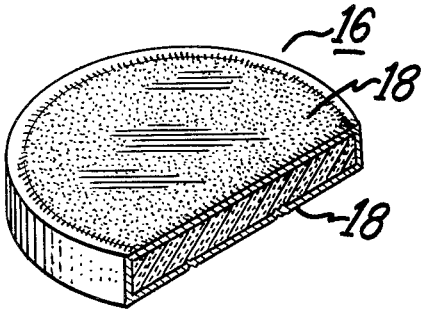

United States Defensive Publication [19] (H) [11] T964,010

Pitha et al. [43] Nov. 1, 1977

[54] NON-LINEAR RESISTANCE OVERVOLTAGE SURGE ARRESTER DISC WITH CERAMIC COLLAR AND METHOD FOR APPLYING

[76] Inventors: John J. Pitha, 165 Walker St., Lenox, Mass. 01240; Howard F. Ellis, Stephentown, N.Y. 12168

[21] Appl. No.: 792,586

[22] Filed: May 2, 1977

Related U.S. Application Data

[60] Continuation of Ser. No. 735,072, Oct. 22, 1976, which is a division of Ser. No. 576,324, May 12, 1975, abandoned.

[51] Int. Cl.[2] ..... B05D 3/02; B05D 5/12; H01C 7/12

[52] U.S. Cl. ..... 428/210; 427/102; 427/279; 428/194

[57] ABSTRACT

A zinc oxide compound nonlinear resistance overvoltage surge arrester disc is provided with a low temperature-curing ceramic antiflashover collar having relatively low coefficient of thermal expansion of about 4.5 $\times 10^{-6}$. The cured ceramic comprises the reaction product of a dry mixture of 80% by weight of mullite refractory filler and 20% kaolin suspending clay, together with 5% to 15% of the weight of the dry mixture of a binder consisting of equal weights of monoaluminum phosphate and concentrated phosphoric acid.

Also disclosed is a method of application comprising the steps of applying the slurry to the perimeter of the disc and baking at a temperature below about 600° Celsius.

11 Claims, 1 Sheet Drawing,

10 Pages Specification

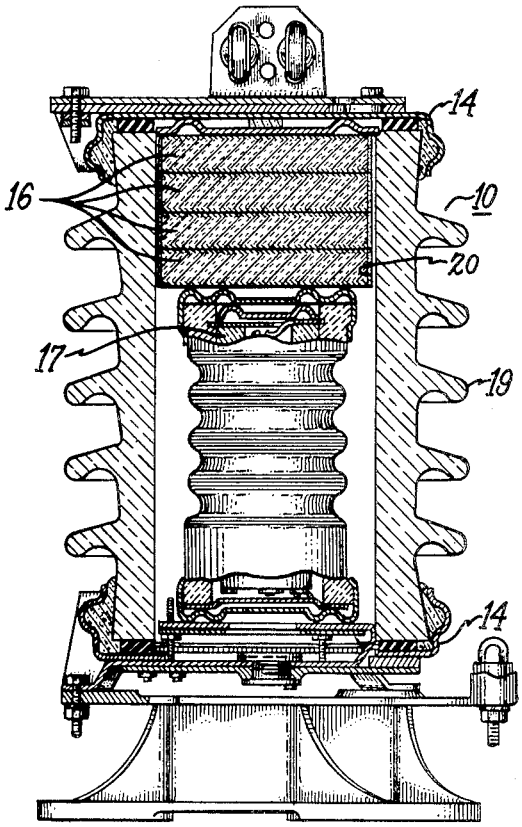

The file of this unexamined application may be inspected and copies thereof may be purchased (849 O.G. 1221, Apr. 9, 1968).